(12) United States Patent
Eiriksson

(10) Patent No.: US 10,681,145 B1
(45) Date of Patent: Jun. 9, 2020

(54) REPLICATION IN A PROTOCOL OFFLOAD NETWORK INTERFACE CONTROLLER

(71) Applicant: Chelsio Communications, Inc., Sunnyvale, CA (US)

(72) Inventor: Asgeir Thor Eiriksson, Sunnyvale, CA (US)

(73) Assignee: Chelsio Communications, Inc.

( * ) Notice: Subject to any disclaimer, the term of this patent is extended or adjusted under 35 U.S.C. 154(b) by 367 days.

(21) Appl. No.: 14/580,117

(22) Filed: Dec. 22, 2014

(51) Int. Cl.
*H04L 29/08* (2006.01)
*H04L 29/06* (2006.01)

(52) U.S. Cl.
CPC ........ *H04L 67/142* (2013.01); *H04L 67/2861* (2013.01); *H04L 67/2866* (2013.01); *H04L 69/16* (2013.01)

(58) Field of Classification Search
CPC .............. H04L 67/142; H04L 67/2861; H04L 67/2866; H04L 69/16
USPC ........................................................ 709/230
See application file for complete search history.

(56) References Cited

U.S. PATENT DOCUMENTS

| | | | | |
|---|---|---|---|---|
| 5,088,032 A * | 2/1992 | Bosack | ................. | H04Q 3/665 370/392 |
| 5,572,698 A * | 11/1996 | Yen | ........................... | G06F 5/10 711/110 |
| 6,427,173 B1 * | 7/2002 | Boucher | ................... | G06F 5/10 709/230 |
| 6,549,516 B1 * | 4/2003 | Albert | ................. | H04L 67/1002 370/236 |
| 7,089,281 B1 * | 8/2006 | Kazemi | ................. | G06F 3/0613 709/203 |
| 7,802,001 B1 * | 9/2010 | Petry | ..................... | H04L 47/193 709/230 |
| 7,835,380 B1 * | 11/2010 | Aloni | .................... | H04L 12/413 370/394 |
| 8,656,017 B2 * | 2/2014 | Wang | ............... | H04L 29/12509 370/230.1 |
| 8,868,790 B2 * | 10/2014 | Lovett | .................... | H04L 49/10 370/463 |
| 8,966,112 B1 * | 2/2015 | Franke | ................. | H04L 69/321 370/229 |
| 9,042,244 B2 * | 5/2015 | Senga | .................... | H04L 69/16 370/252 |
| 9,203,728 B2 * | 12/2015 | Pyatkovskiy | ........... | H04L 43/10 |

(Continued)

OTHER PUBLICATIONS

Athresh, Akhila, "*Final Report: Implementing Multi-cast Data Replication for Hadoop*", URL: http://www.cs.columbia.edu/~msz/projects/2013-Spring-Hadoop/final_report.pdf, May 18, 2013, 6 pages.

*Primary Examiner* — Michael Won
(74) *Attorney, Agent, or Firm* — Lee & Hayes, P.C.

(57) ABSTRACT

Data replication can be supported efficiently in a protocol offload device (such as a protocol offload device to offload transport layer protocol processing from a host) by supporting a shared memory (SHM) abstraction for the send and receive buffers that are used in protocol offload devices. The protocol offload send and receive buffers are accessed using a per offloaded connection virtual address method that maps transport protocol sequence numbers (such as TCP protocol sequence numbers), to memory locations within buffers, and, for example, either page tables and paged memory or segment tables and segmented memory tables are used to access the memory.

17 Claims, 6 Drawing Sheets

(56) References Cited

U.S. PATENT DOCUMENTS

| | | | |
|---|---|---|---|
| 9,639,553 B2* | 5/2017 | Hall | G06F 17/30174 |
| 9,794,222 B2* | 10/2017 | Pettit | H04L 63/0236 |
| 2001/0023460 A1* | 9/2001 | Boucher | G06F 5/10 |
| | | | 709/250 |
| 2002/0152299 A1* | 10/2002 | Traversat | G06F 9/4416 |
| | | | 709/223 |
| 2002/0156927 A1* | 10/2002 | Boucher | H04L 29/06 |
| | | | 709/250 |
| 2002/0166080 A1* | 11/2002 | Attanasio | H04L 29/06 |
| | | | 714/15 |
| 2003/0167346 A1* | 9/2003 | Craft | H04L 45/00 |
| | | | 709/250 |
| 2004/0003126 A1* | 1/2004 | Boucher | H04L 29/06 |
| | | | 709/250 |
| 2004/0024894 A1* | 2/2004 | Osman | H04L 69/16 |
| | | | 709/230 |
| 2004/0044744 A1* | 3/2004 | Grosner | H04L 29/06 |
| | | | 709/217 |
| 2004/0122888 A1* | 6/2004 | Carmichael | H04L 12/2801 |
| | | | 709/200 |
| 2004/0264481 A1* | 12/2004 | Darling | H04L 29/06 |
| | | | 370/401 |
| 2005/0063300 A1* | 3/2005 | Dominic | H04L 29/12292 |
| | | | 370/216 |
| 2005/0213517 A1* | 9/2005 | Rodman | H04L 12/66 |
| | | | 370/260 |
| 2005/0259678 A1* | 11/2005 | Gaur | H04L 63/145 |
| | | | 370/463 |
| 2006/0004904 A1* | 1/2006 | Sarangam | H04L 69/12 |
| | | | 709/200 |
| 2006/0015618 A1* | 1/2006 | Freimuth | G06F 12/0862 |
| | | | 709/226 |
| 2006/0104308 A1* | 5/2006 | Pinkerton | H04L 63/0485 |
| | | | 370/469 |
| 2006/0165074 A1* | 7/2006 | Modi | H04L 29/12367 |
| | | | 370/389 |
| 2006/0235977 A1* | 10/2006 | Wunderlich | H04L 67/1097 |
| | | | 709/227 |
| 2007/0147390 A1* | 6/2007 | Jung | H04L 69/16 |
| | | | 370/395.52 |
| 2007/0168446 A1* | 7/2007 | Keohane | G06Q 10/107 |
| | | | 709/207 |
| 2007/0283024 A1* | 12/2007 | Landrum | H04L 67/28 |
| | | | 709/228 |
| 2008/0310419 A1* | 12/2008 | Bansal | H04L 45/00 |
| | | | 370/395.6 |
| 2008/0320151 A1* | 12/2008 | McCanne | H03M 7/30 |
| | | | 709/228 |
| 2009/0217374 A1* | 8/2009 | Liu | G06F 21/85 |
| | | | 726/19 |
| 2010/0262650 A1* | 10/2010 | Chauhan | H04L 67/26 |
| | | | 709/203 |
| 2010/0325485 A1* | 12/2010 | Kamath | G06F 11/2097 |
| | | | 714/15 |
| 2011/0320588 A1* | 12/2011 | Raleigh | H04W 36/245 |
| | | | 709/224 |
| 2012/0039332 A1* | 2/2012 | Jackowski | H04L 69/32 |
| | | | 370/389 |
| 2012/0078994 A1* | 3/2012 | Jackowski | H04L 47/19 |
| | | | 709/202 |
| 2013/0007480 A1* | 1/2013 | Wertheimer | G06F 1/3203 |
| | | | 713/310 |
| 2013/0077486 A1* | 3/2013 | Keith | H04L 47/2433 |
| | | | 370/230.1 |
| 2013/0132531 A1* | 5/2013 | Koponen | H04L 41/0823 |
| | | | 709/220 |
| 2014/0012981 A1* | 1/2014 | Samuell | H04L 43/0811 |
| | | | 709/224 |
| 2014/0204746 A1* | 7/2014 | Sun | H04W 28/0247 |
| | | | 370/235 |
| 2014/0204954 A1* | 7/2014 | Nee | H04L 45/302 |
| | | | 370/401 |
| 2015/0032691 A1* | 1/2015 | Hall | G06F 17/30174 |
| | | | 707/610 |
| 2015/0370666 A1* | 12/2015 | Breakstone | G06F 11/2012 |
| | | | 714/6.3 |
| 2016/0043969 A1* | 2/2016 | Sung | H04L 47/825 |
| | | | 370/392 |
| 2016/0077857 A1* | 3/2016 | Dong | G06F 9/466 |
| | | | 718/1 |
| 2017/0063786 A1* | 3/2017 | Pettit | H04L 63/0236 |
| 2017/0237668 A1* | 8/2017 | Hall | H04L 29/06 |
| | | | 370/235 |
| 2018/0260125 A1* | 9/2018 | Botes | G06F 3/0617 |

* cited by examiner

REPLICATION IN A PROTOCOL OFFLOAD NETWORK INTERFACE CONTROLLER

TECHNICAL FIELD

The present invention relates to supporting replication within a protocol offload network controller. Replication is supported in the send direction by sending the same copy of the data using multiple offloaded connections to possibly multiple destinations through possibly multiple ports. Replication is supported in the receive direction by forwarding received data to multiple destinations.

BACKGROUND

A Network Interface Controller (NIC)—which may be, for example, network interface circuitry, such as within a system on a chip (SoC)—is typically used to couple one or more processors to a packet network through at least one interface, called a port. NIC circuitry has been an area of rapid development as advanced packet processing functionality and protocol offload has become common for so called "smart NICs."

SUMMARY

In accordance with an aspect of the invention, network interface circuitry, forming a local node, is configured to couple a host computer and a network. The network interface circuitry comprises at least one processor configured to offload from the host computer at least a portion of communication protocol processing to accomplish at least two stateful communication connections between the host computer and a peer via the network, further the processor has the capability to replicate data, to send the same data over multiple connections in the send direction, and separately to send the same data over multiple connections in the receive direction.

The uses for replication include data replication in Distributed File Systems (DFS) such as Hadoop® FS, and the Microsoft Azure™ cloud. These distributed file systems typically replicate data on write to implement reliability, e.g. when data is written in the Hadoop® FS, the default is to replicate the data three times, typically over a network connection, and write the data to three different locations to minimize the chance of catastrophic failure resulting from the malfunction of a storage device. The current state of the art writes the data three times from the storage controller host application as if it were three different writes. This invention describes how the sending of the replicated data can be offloaded to the protocol offload device and thereby making the replication more efficient, requiring less CPU cycles, less host memory bandwidth, in some use cases less PCIe bandwidth, and in some use cases less Ethernet bandwidth.

Another application is to implement a reliable multi-cast service on top of a reliable transport layer service such as TCP, on top of an unreliable data link layer service such as Ethernet. The TCP/IP protocol is point-to-point but, with the replication capability, a reliable multi-cast can be implemented to deliver reliable messaging services to multiple subscribers.

DETAILED DESCRIPTION

The inventor has realized that data replication can be supported efficiently in a protocol offload device (such as a protocol offload device to offload transport layer protocol processing from a host) by supporting a shared memory (SHM) abstraction for the send and receive buffers that are used in protocol offload devices. The protocol offload send and receive buffers are accessed using a per offloaded connection virtual address method that maps transport protocol sequence numbers (such as TCP protocol sequence numbers), to memory locations within buffers, and, for example, either page tables and paged memory or segment tables and segmented memory are used to access the memory. The mapping process from sequence numbers to memory addresses may be similar to a process used in conventional computer systems to map a virtual address to an address in memory. The SHM abstraction in the protocol offload device may be implemented by adding a reference count to each allocated page or segment similar to the way it would be implemented in a conventional computer system. The reference count, in the protocol offload device, is initialized to the number of sharers (transport layer connections collectively referred to as a replication group of connections) when the page or segment is allocated from a free list pool and is decremented by each of the sharers when it has finished using the page. The page is returned to a free list pool when all the sharers have finished using the page. A sharer is using a page until all the data has been successfully sent for that sharer, and this is typically detected by observing the value of a connection sequence number. Once the sequence number has progressed beyond the end of a page or segment, the sharer is no longer requiring the page or segment and the page can be freed. When all the sharers in a replication group have progressed beyond a page the reference count has been decremented back to zero and a page can be returned to what is conventionally referred to as a free list pool. With the SHM abstraction a protocol offload device has thus accomplished sending the same data multiple times, has replicated the data from a single copy of the data provided to the network interface circuitry from the host. A protocol offload device can support multiple offloaded connections simultaneously and the invention enables supporting multiple replication groups simultaneously. A DFS could for example create a replication group for each write, or it could use multiple replication groups of connections and then load balance the different groups based on the progress within each group.

Figure 1:
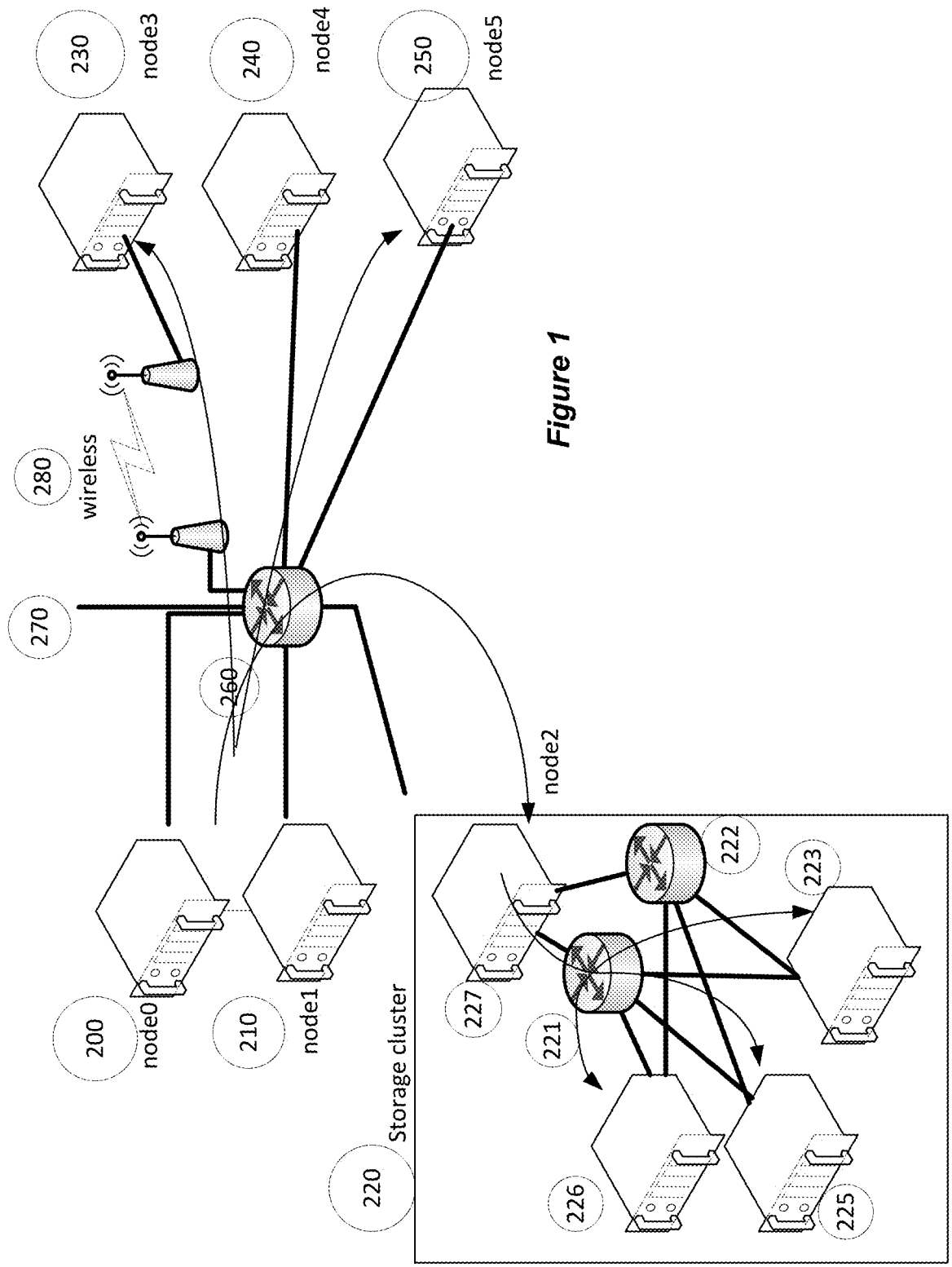
FIG. 1 is a block diagram illustrating a distributed computer system and examples of the use of replication in this system.

Referring to FIG. 1, a distributed computing system includes multiple nodes node0 . . . node5 connected with a network through switches or routers using land lines or wireless connections. The land lines typically use Ethernet and the wireless link typically uses WiFi, or 4G, or WiGiG technology. The network typically runs the IP protocol and the reliable transport protocol is typically TCP. Some of the nodes such as node2 can include clusters of nodes connected with IP running over Ethernet or can include PCIe links and switches. Examples of other options for the local network within the cluster include Infiniband, Data Center Ethernet, and FibreChannel. Each of these network choices have one or more issues when deployed in the non-cluster portion of the network: none of the technologies support the wireless link, and all would require special switches and routers to replace the generic equipment which suffices with TCP/IP while TCP/IP supports the special equipment also.

The first example of replication shown in the Figure has node0 replicate the send data to node2, node3, and node 5, and the replication is accomplished in the protocol offload device within node0 as is described in more detail below. In the case where the switches 221 and 222, within cluster 220, are PCIe switches the protocol offload device within 227 optionally replicates the data in the receive direction, processes the TCP/IP protocol in the receive direction and then sends multiple copies on PCIe to different nodes within a PCIe fabric. In the case where 221 and 222 are Ethernet switches, the protocol offload device within 227 replicates the data in the send direction. For example, the storage controller software within node2 227 determines that it has received a write request and opens (or has already opened) three connections to node 226, node 225, and node 223, respectively, and writes the data to these three offloaded connections from the same SHM send buffer.

There can be failures in equipment during the replication process for example node5 250 might become unreachable during the replication process, and it is important that the replication process complete successfully in spite of failures if possible. When node5 becomes unreachable the TCP protocol retry mechanism will periodically try to resend the data that has not been acknowledged but will eventually give up after a settable number of maximum attempts have been made. The connections from node0 to node2 and the connection from node0 to node3 will independently send their data and as long as node2 and node3 are working correctly the sent data will be acknowledged, and the other two connections are not affected by the connection sending from node0 to node5 falling behind because its sent data is not being acknowledged. Once the sending connection from node0 to node5 gives up attempting to send the connection will be aborted and as part of the abort process the offload device will free any memory resources held by the aborting connection, the page reference count will be decremented for each of the pages allocated to the failing connection. When the failing connection is the last connection holding on to a page the page will be returned to the free list pool. The effect of the failure of the connection from node0 to node5 is therefore not detected by the other connections in the replication group; the other connections are not affected by a failure in one of the other connections in the group. In this failure case the software on node0 will be notified of the failure of one of the replication group connections and will need to react accordingly, in this case by creating a copy of the data that was not successfully created as part of the replication process and storing that instead on a different node.

Figure 2:
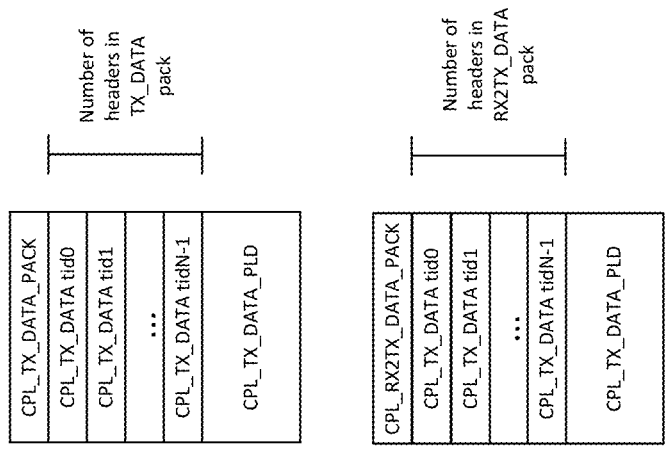
FIG. 2 is a block diagram illustrating the CPL_TX_DATA_PACK and CPL_RX2TX_DATA_PACK messages.

The protocol processing pipeline employs CPL messages transmitted between the protocol processing pipeline circuitry and the host and a control plane processor (typically, network interface circuitry driver software operating on the host and there is typically a control plane processor in the same interface circuitry as the protocol processing pipeline): it receives and it sends messages. CPL messages described, for example, in U.S. Pat. No. 7,945,705 entitled "METHOD FOR USING A PROTOCOL LANGUAGE TO AVOID SEPARATE CHANNELS FOR CONTROL MESSAGES INVOLVING ENCAPSULATED PAYLOAD DATA MESSAGES." For this application, the CPL_TX_DATA_PACK message is added which is shown in FIG. 2. The CPL_TX_DATA_PACK message includes a CPL_TX_DATA_PACK header, multiple CPL_TX_DATA headers and a single CPL_TX_DATA payload referred to in the following as CPL_TX_DATA_PLD. The CPL_TX_DATA_PACK header contains a parameter called "number" that indicates the number of CPL_TX_DATA headers contained with the PACK message, and each is identical to the header of the CPL_TX_DATA message. For the receive direction, the current invention may use the CPL messages described in U.S. Pat. No. 7,945,705, e.g. either the CPL_RX_DATA message, or the CPL_RX_PHYS_ADDR, and the CPL_RX_ DATA_DDP, or CPL_RX_DDP_COMPLETE messages. In failure cases where a connection is not able to send data the offload device will send a CPL_ABORT_REQ_RSS message to the control plane, and will receive a CPL_ABORT_RPL_RSS message when e.g. the pages held by the failing connection can be freed.

Figure 4:
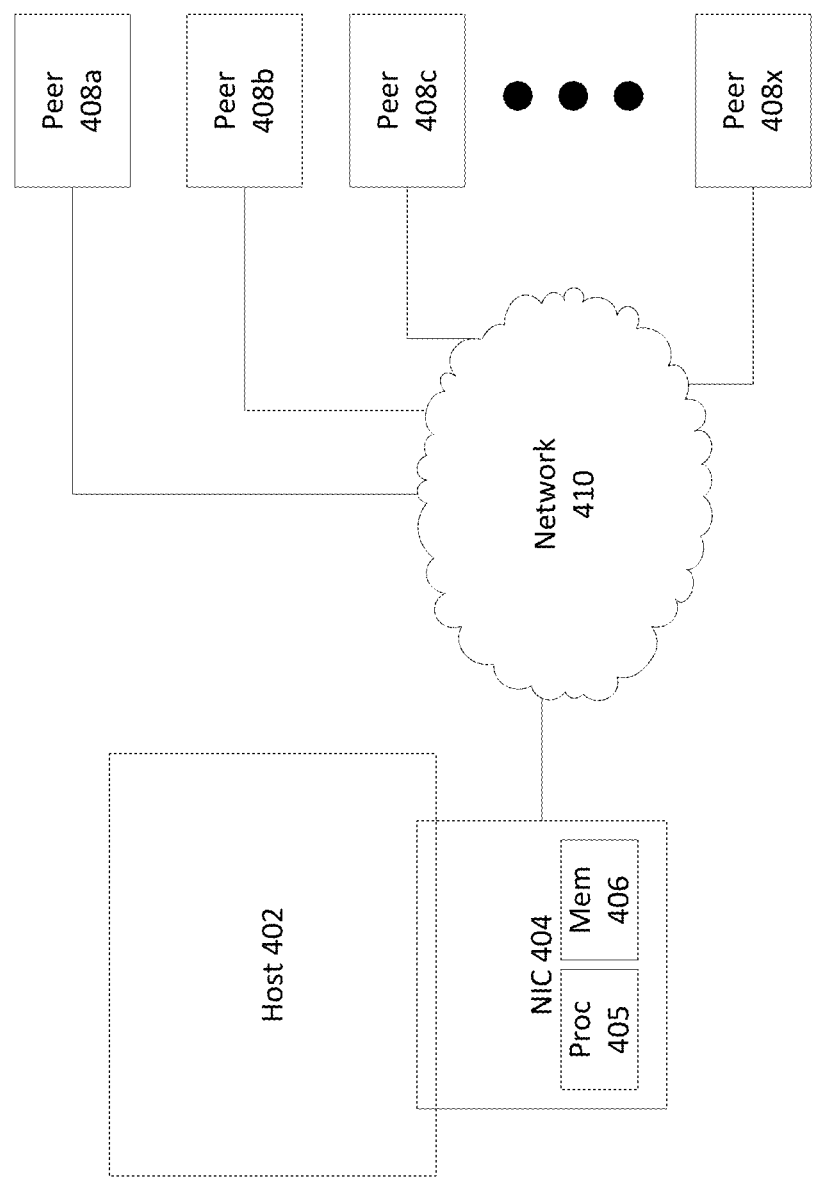
FIG. 4 broadly illustrates an architecture in which an embodiment of the inventive method may operate.

FIG. 4 broadly illustrates an architecture in which an embodiment of the inventive method may operate. As shown in FIG. 4, a host 402 interoperates with a NIC 404. The NIC 404 includes at least one processor 405 which executes software and/or firmware. A memory 406 is also included into which send and/or receive data to be replicated may be stored. The memory 406 is either a dedicated memory and/or memory accessed via the host 402 system memory bus, and as noted previously the host 402 and the NIC 404 could be part of the same SoC. When the memory is accessed via the host 402 it is not required to provide a copy of the data to the NIC and it is an option instead to pass a pointer to the data accessible by protocol processor. The CPL_TX_DATA message can be modified in this case to provide a pointer to the data instead of providing a copy of the data. Furthermore, the NIC 404 operates a separate stateful connection with each of a plurality of peers 408n via a network 410. Thus, for example, in response to one or more appropriate CPL messages from the host 402 such as described below, the NIC 404 operates the separate stateful connections with the peers 408n. In operating the separate stateful connections, at least one data item received by the NIC 404 from the host 402 is reliably transmitted to each of the plurality of peers 408n. Upon completion of the reliable transmission, the NIC 404 provides an indication accessible to the host 402 that the transmission to all peers is complete.

Figure 3:
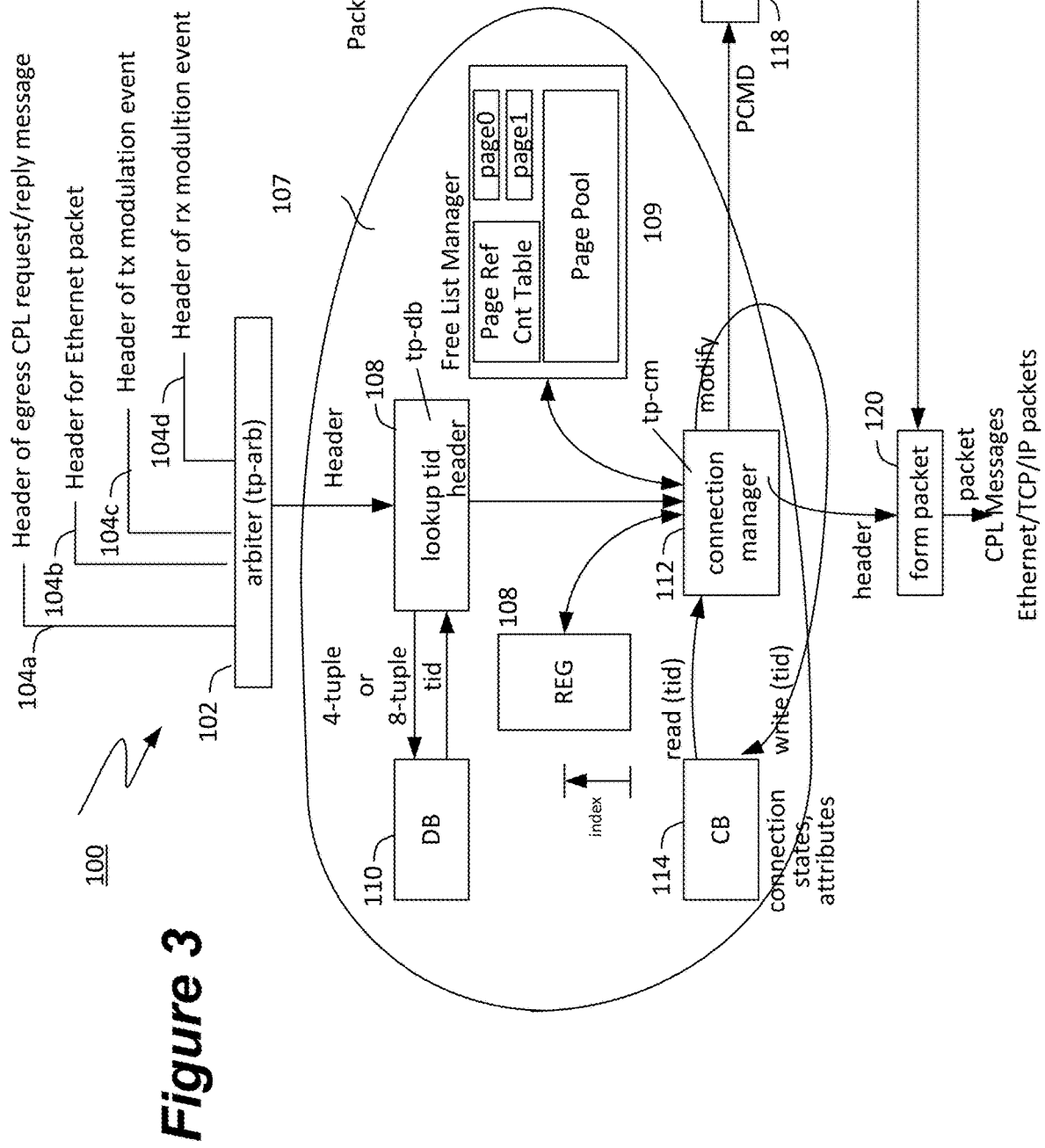
FIG. 3 is block diagram illustrating a protocol processing pipeline and how replication is supported within the processor.

Refer now to FIG. 3 that shows the common processing pipeline for sent and received packets that may be executed, for example, by the processor 405. The received TCP/IP packets arrive from Ethernet 104b and the TCP/IP protocol is processed and the packets are either sent as CPL messages to the core where core can be a host computer connected to the protocol processor via PCIe or is connected to the protocol processor via a system bus such as the ARM ACE bus interface module. The protocol processor and the host computer may reside on different chips or may be part of a system on the same chip. When the protocol processing pipeline processes the received packet, it is also possible that the received packets are to loop around, are TCP proxied to another connection that handles the sending of the packets. In this case the CPL_RX2TX_DATA message is used to forward receive data from one connection to another different connection that will send the data.

For the send direction from ACE or PCIe, a multi-header CPL_TX_DATA_PACK arrives in 104a and the arbiter 102 grants all the CPL_TX_DATA headers through the pipeline without allowing any other source for arbitration such as Ethernet packets or internal events such as timer events or tx or rx modulation events to win the grant. The CPL_TX_DATA headers each contain a connection identifier tid, and each in succession look up their 4-tuple information in DB 110 and when they get to the connection manager 112 a new page or pages are allocated if required. The CPL_TX_DATA_PACK message is shown in FIG. 2. The page size is typically larger than the largest CPL_TX_DATA payload and there can therefore be zero, one or two pages that need to be allocated. The zero pages required case corresponds to the payload all fitting on the last currently allocated page, the one page case to a payload that all fits on a page when the send buffer is empty, and the case where the payload straddles a page, and the two page case when the payload arrives when the buffer is empty and it straddles a page. In the SHM case, the page or pages that are allocated are stored in the page0 and page1 registers when required within the Free List Manager (FLM) 109. The first header allocates the pages and writes the common payload to the page(s). Subsequent headers reference the page0 and page1 registers and increment the reference count for those pages. The first CPL_TX_DATA header can store the payload in a send buffer and concurrently send out one packet in cut-through fashion, while the other CPL_TX_DATA headers need to read from the send buffer to send a packet. This read can be made efficient by caching parts of the send buffer in anticipation of the data likely being used, i.e., by anticipating the locality in time of the data reference. To send the rest of the data, a tx modulation event is issued to send out the rest of the payload that can be sent. Subsequent headers increment that state variable tx_max by the payload length stored in each header that keeps track of the end of the per-offloaded connection send buffer.

The send buffer is accessed through a virtual address mechanism where the high order bits of the TCP sequence numbers are mapped to memory addresses by using page tables and the offset within those pages are the low order bits of the sequence numbers. The location of the data is flexible and it can reside in an SRAM, a DRAM, or it can reside in a system memory. The access to this memory can be through a second level of virtual memory access, e.g. the system memory is typically accessed through a second table that in effect maps from the protocol offload address space to virtual or physical system memory addresses. The SHM mechanism is not dependent on the physical location of the send buffer or the existence of these secondary mappings; the SHM mechanism operates in a virtual address space with the location and multiple levels of mapping hidden.

The processing of the multi-header CPL_TX_DATA_PACK is separate from the processing of the offloaded connection, i.e., each of the offloaded connections operates without knowledge of the SHM abstraction that is being employed. The offloaded connections that use the SHM abstraction support all the features supported for connections that do not use the SHM abstraction, that are participating in a replication group. For example, the offloading of the iWARP RDMA and iSCSI protocols and encryption/decryption and authentication protocols is still supported. The protocol processing part is not dependent on the pages being shared, and each offloaded connection progresses at its own pace and releases the allocated pages, decrementing the reference count when the particular connection has finished using a page. When all the connections have finished using a page, the reference count goes down to zero and, according to the SHM abstraction, the page is released back to the free-list pool. The same applies to a close connection Ethernet TCP/IP packet that carries a FIN or a RST message or any other of the TCP flags. They are processed independent of the sharing, and the same applies to CPL close and abort messages, that are initiated from the PCIe/ACE side. The SHM abstraction provides the illusion, to the processing of each individual connection, of dedicated memory pages, and it is left to the free-list manager to manage the abstraction. The independent processing of the CPL abort and TCP RST messages for the different connections can be important when one or more of the replication connections fails due to hardware or software failure somewhere in the path from the sender to one of the receivers. Such failures can include, for example, power outage and end equipment malfunctions of various kinds. The failing connection in this case periodically attempts to retransmit data, according to the rules specified as part of the TCP protocol specification, until the sender finally gives up after some number of re-transmit attempts. The control plane receives a CPL abort message from the connection and it then sends a message to a higher layer software entity that is managing the replication process. This removes the failed connection from the replication group and the higher layer software entity reacts to the connection failure according to its own rules and/or procedure such as, for example, designating a different connection to replace the failed connection in the replication group. As part of a connection abort any resources held by an offloaded connection are freed, the memory page reference count is decremented for any pages allocated to the aborting connection and the memory pages are returned to the memory page free list if the failing connection is the last connection to hold onto the pages.

Figure 6:
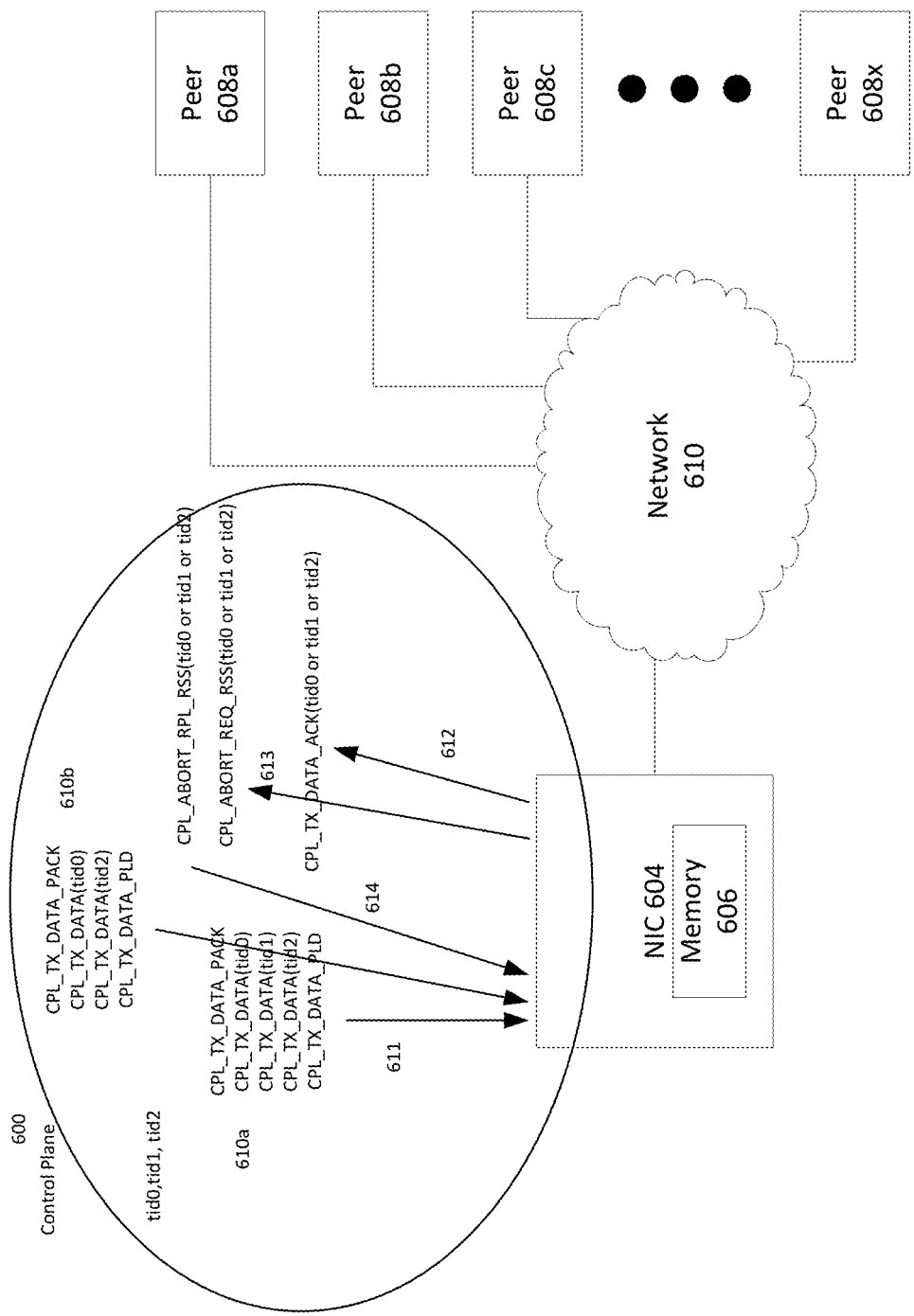
FIG. 6 illustrates the typical sequences of CPL messages used in replication process

Refer now to FIG. 6 for a more detailed description of the replication process that includes description of failure handling. The control plane 600 in this case is either on a host computer connected to the NIC 604, on a processor on the same silicon as the NIC or consists both of a host and an integrated processor. In this example there are three connections tid0, tid1, and tid2 that are used in the write replication process. Each connection is created separately for example starting with the CPL_ACT_OPEN message. Then the data copy part of the replication process starts with a sequence of CPL_TX_DATA_PACK messages 610a that consist of three CPL_TX_DATA headers with tid0, tid1, and tid2, and a single data payload CPL_TX_DATA_PLD. The data payload is either a copy of the payload or a pointer to the payload accessible by protocol processor. The offload device returns CPL_TX_DATA_ACK message periodically to report progress back to the control plane that indicates the point where all of the tid0, tid1 and tid2 have reached in the sending the data. The CPL_TX_DATA_ACK 612 contains the tid of the connection that was last to reach a particular send sequence number that is reported in the CPL header. When the control plane receives a CPL_ABORT_REQ_RSS message with a tid value set to one of tid0, tid1, tid2, we will assume tid1 without loss of generality, which indicates that there has been a fatal error in the tid1 connection. The control plane 600 can react to this ABORT message by sending only tid0 and tid2 in the DATA_PACK from this point on in the replication process as shown in 610b. The control plane then responds to the CPL_ABORT_REQ_RSS with a CPL_ABORT_RPL_RSS that allows the offload device to free all the resources, e.g. any memory pages held by the failing connection tid1. Typically this will also create additional CPL_TX_DATA_ACK message(s) that then indicate the progress of the tid0 and tid2 connections. The tid0 and tid2 connections will then be provided with additional CPL_TX_DATA_PACK messages until replication process has progressed up to the next write replication request when there is an opportunity to add a new connection for the failed tid1 connection in order to continue to create the required number of replicated copies. The failed tid1 connection will lead to a recovery process that will entail at a minimum opening a different connection to the failing node, in case the failure was due to equipment in the path from sender to receiver, or will involve creating a copy of the data on the failed node in case the failure was in the node itself.

For received packets that arrive on 104b to the arbiter, the 4-tuple is looked up to determine the tid of the offloaded connection that in turn is used to fetch the connection state from the CB 114. When the connection manager determines that the packet is to be accepted, it allocates a REG entry 108 to store the state connection state update and issues an rx modulation event to each of a list of connections, each identified by a tid, stored as part of the state of the connection. These rx modulation events have a payload that includes each tid and a REG index value where the state update is stored. When the register REG is allocated it has a reference count that indicates the number of sharers. Each of the rx-modulation events are injected into the pipeline in 104d, and use their tid to look up the connection state, and when they reach the connection manager 112 they use the register state to update the connection state and decrement the reference count of the register entry. When the reference count reaches 0, the register entry is freed and is available to be used for another group of receive sharers. In the case when a REG is not available when one needs to be allocated, the Ethernet TCP/IP packet is dropped, and in that case it will eventually be resent by the sender.

Figure 5:
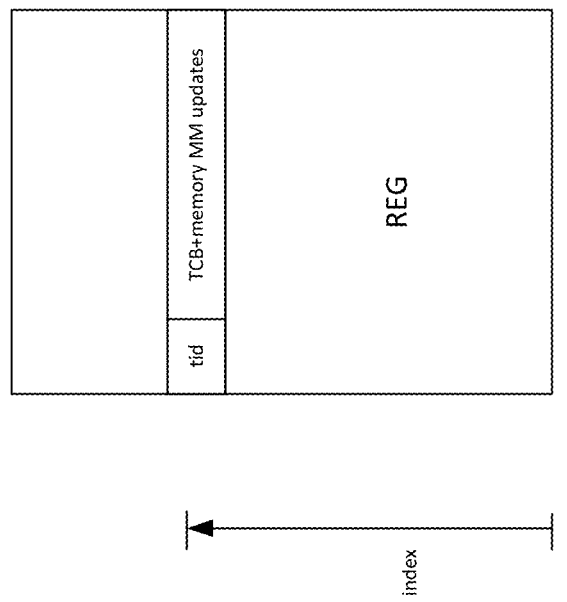
FIG. 5 illustrates register fields used to optimize the number of pending rx-modulation events.

It is possible to receive multiple packets that each allocates a REG entry, and that there are multiple rx-modulation events issued, to each of the sharers. The rx-modulation events are FIFO ordered and multiple rx-modulation events can therefore be outstanding to the same tid and are processed in order. It is also possible to update the same REG entry and to keep track of which sharers have processed earlier updates and to issue only rx-modulation events for those sharers. Refer now to FIG. 5 that shows a REG structure to store the tid of the offloaded connection with an outstanding rx-modulation event. When a new event is to be scheduled, it is therefore possible to search all the indices for entries with matching tid. When a matching entry is found, the TCB updates and memory-manager updates are made to the existing REG entry instead of creating a new REG entry, and this in turn increases the capacity and allows handling more multi-cast receive connections.

The tid that receives the multi-cast can, in addition be a proxy tid that is forwarding its payload to another connection that is sending. The proxy messages, for example CPL_RX2TX_DATA shown in FIG. 2 and described in U.S. Pat. No. 7,616,563 titled "METHOD TO IMPLEMENT AN L4-L7 SWITCHUSING SPLIT CONNECTIONS AND AN OFFLOADING NIC," can be extended to have multiple CPL_TX_DATA within a CPL_RX2TX_DATA_PACK message, thereby replicating in the send direction in continuation of the replication in the receive direction. Only one proxy connection is connected back to the receive direction.

The interface to the offloaded replication can either be part of, for example, RDMADataStreamer, or it can be part of a generalized memcpy( )-like Linux library function. In the first case, the multiple connections would be generated within the Java class and then the CPL_TX_DATA_PACK would be generated within the Java class. It is also possible that the protocol offload device participates in a ccNUMA protocol and that the interface to the replication facility includes a memcpy(dst0, dst1, . . . , dstn-1,src) library function that copies the data to dst0, dst1, dstn-1, from src using CPL_TX_DATA_PACK.

For receive side replication, the configuration may be accomplished through the Java class configuration, e.g., by configuring the receiving connection to copy the received data to objects that accomplish the local write part of the write operation.

The send and receive side replication can also be managed via a multicast join/leave type of mechanism—in which a join/leave is used to join/leave a multi-cast group implemented with the TCP/IP replication. The join/leave entails creating multiple connections in the send direction for each distinct destination, with another option being to create a proxy connection on the receive side. The replication on the receive side can be used to multi-cast to multiple subscribers reachable over the same PCIe bus or ACE interface.

We have thus described a system and method in which a protocol offload device (such as a NIC to offload transport layer protocol processing from a host) may reliably replicate and transmit data, originating from the host, to a plurality of peers via a network. The reliable transmission may be, for example, at the transport layer. Further, the NIC may employ a shared memory mechanism such that the host need not provide multiple copies of the data to the NIC but, rather, the host may consider the transmission, from its point of view, as a single transaction. The NIC handles transmission of same data to multiple peers and, upon completion of reliable transmission, notifies the host that the transmission transaction is complete. Furthermore the protocol offload device may reliably replicate received packets from the network to multiple destinations on a host. Finally the protocol offload device is capable of simultaneously replicating received packets to multiple destinations on that host and to proxy the received packets to connections that send the packets out to the network.

What is claimed is:

1. Network interface circuitry, configured to couple a host computer and a network, the network interface circuitry comprising at least one processor configured to:
   offload from the host computer at least a portion of transport layer communication protocol processing to accomplish at least two separate stateful transport layer communication connections, each between the host computer and a peer, wherein the two separate stateful layer communication connections are between the host and two separate peers; and
   access at least one data item originating from the host;
   wherein the at least a portion of transport layer communication protocol processing by the network interface circuitry includes replicating the accessed at least one data item to generate a plurality of replicated data items and providing each of the plurality of replicated data items from the network interface circuitry using a separate one of the at least two separate stateful transport layer communication connections, and
   wherein when the plurality of replicated data items are provided from the network interface circuitry using the at least two separate stateful transport layer communication connections, maintain a single data structure to indicate a state of all of the at least two separate stateful transport layer communication connections.

2. The network interface circuitry of claim 1, wherein:
   at least one of the stateful transport layer communication connections is to a peer residing on the host.

3. The network interface circuitry of claim 1, wherein:
at least one of the stateful transport layer communication connections is to a peer residing across the network.

4. The network interface circuitry of claim 1, wherein the network interface circuitry is configured to receive from the host computer the at least one data item and an indication of the at least two separate stateful transport layer communication connections.

5. The network interface circuitry of claim 4, wherein:
the received indication of the at least two separate stateful transport layer communication connections is a proxy for, what appears to the host to be, a single stateful transport layer communication connection, wherein a mapping of the at least two separate stateful transport layer communication connections to the received indication is maintained by the network interface circuitry.

6. The network interface circuitry of claim 1, wherein:
the processor is configured to operate the transport layer communication protocol processing offload at least in part according to transport layer communication connection states maintained in a memory accessible by transport layer communication protocol processing offload operation, including accessing each transport layer communication connection state in the memory using the access procedure, to access that transport layer communication connection state in the memory according to an identifier corresponding to that transport layer communication connection state.

7. The network interface circuitry of claim 1, wherein:
the processor is configured to provide information regarding the reliability at which the plurality of replicated data items have been transmitted via the at least two separate stateful transport layer communication connections.

8. The network interface circuitry of claim 7, wherein:
the processor being configured to provide information regarding the reliability at which the plurality of replicated data items have been transmitted via the at least two separate stateful transport layer communication connections includes the processor being configured to provide the information to the host.

9. The network interface circuitry of claim 7, wherein:
the processor being configured to provide information regarding the reliability at which the plurality of replicated data items have been transmitted via the at least two separate stateful transport layer communication connections includes the processor being configured to provide the information to control plane processing of the network interface circuitry.

10. The network interface circuitry of claim 7, wherein:
the processor being configured to provide information regarding the reliability at which the plurality of replicated data items have been transmitted via the at least two separate stateful transport layer communication connections includes the processor being configured to provide the information to both the host and to the control plane processing of the network interface circuitry.

11. The network interface circuitry of claim 7, wherein:
the processor being configured to provide information regarding the reliability at which the plurality of replicated data items have been transmitted via the at least two separate stateful transport layer connections includes the processor being configured to provide information that the plurality of replicated data items were not successfully transmitted via the at least two separate stateful transport layer communication connections.

12. The network interface circuitry of claim 7, wherein:
the processor is configured to maintain a reference count of a number of the at least two stateful transport layer communication connections; and
the processor is further configured to adjust the reference count based on the at least two separate stateful transport layer communication connections successfully transmitting the plurality of replicated data items,
the processor providing the collective notification upon the reference count indicating that the plurality of replicated data items have been reliably transmitted via all of the at least two separate stateful transport layer communication connections.

13. The network interface circuitry of claim 12, wherein:
the collective notification to the host includes releasing space in a memory into which the host provided the plurality of replicated data items.

14. The network interface circuitry of claim 1, wherein:
at least one data item originating from the host is stored in a memory accessible by the transport layer communication protocol processing offload operation.

15. The network interface circuitry of claim 14, wherein:
the transport layer communication protocol processing offload operation for each of the at least two separate stateful transport layer communication connections includes adjusting a pointer for that stateful transport layer communication connection according to transmission of one of the plurality of replicated data items by the network interface circuitry, via that stateful transport layer communication connection.

16. The network interface circuitry of claim 15, wherein:
adjusting a pointer for that stateful transport layer connection includes adjusting the pointer based on a change in transmission sequence number for that stateful transport layer communication connection.

17. The network interface circuitry of claim 1, configured such that:
the plurality of replicated data items originating from the host are looped around to be received data on at least one other stateful transport layer communication connection, of the at least two stateful communication connections, with the host.

* * * * *